March 22, 1966 M. W. DINGBAUM 3,241,851
MOBILE ANIMAL SUPPORT
Filed Jan. 13, 1964
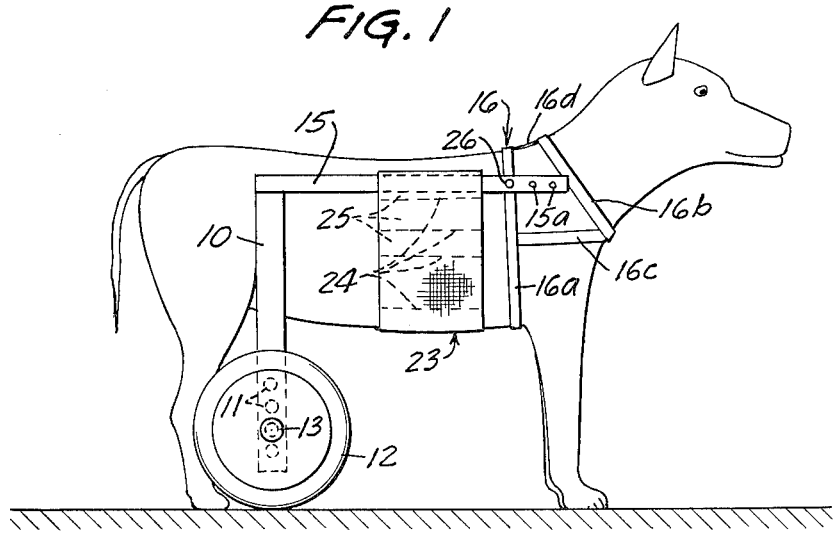
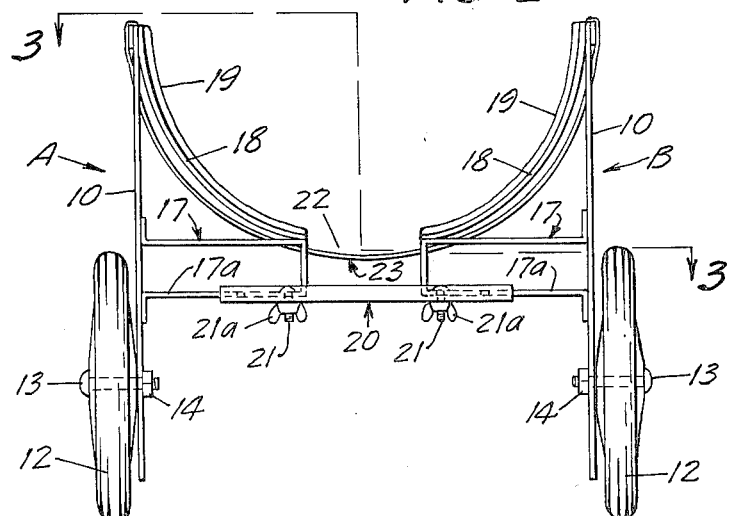
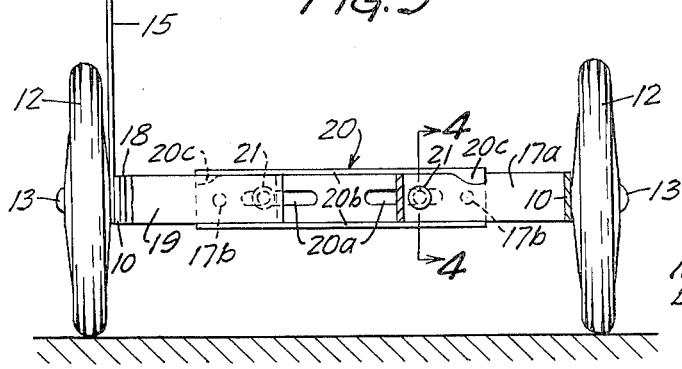
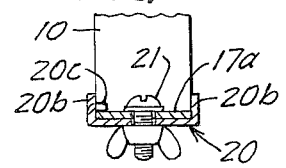
INVENTOR
MERALD W. DINGBAUM
BY Williamson & Palmatier
ATTORNEYS United States Patent Office 3,241,851
Patented Mar. 22, 1966

3,241,851
MOBILE ANIMAL SUPPORT
Merald W. Dingbaum, 19 Forest Heights, Landfall
Village, St. Paul, Minn. 55119
Filed Jan. 13, 1964, Ser. No. 337,325
12 Claims. (Cl. 280—34)

This invention relates to devices for supporting injured or otherwise incapacitated animals. More particularly, this invention relates to mobile supporting means which supports the injured or weakened portions of the animal's body and completely or partially relieves the strain thereon and enables the animal to move about with reasonable facility.

Although the device of this invention is applicable to all four legged animals, it has particular applicability to small household pets such as dogs, cats and the like. These animals frequently become incapacitated due to sustaining crippling injuries or diseases to their backs or legs which prevent normal use of the legs of the animal and oftentimes prevent the animal from walking and moving about. These crippling conditions may be temporary or permanent, and may be caused by a variety of circumstances, such as paralysis, breaking of a leg, old age, disease, etc. The inability of the animal to move about is unpleasant for the animal and the owners thereof, increases the amount of care and attention required on the part of the owners, frequently inhibits the rate of recovery of the animal and in some instances may cause the animal to die, either because of the animal's failure to respond to treatment or because it develops a fatal morbid attitude.

Therefore, an object of this invention is to provide a device which is attachable to the animal which is adapted to completely or partially support the weight of the injured portion of the animal which enables the animal to move about and live in a substantially normal fashion while crippled or injured.

Still another object is to provide a device of the type above described which can be readily adjusted to animals of different size and which is of relatively simple design and inexpensive construction and which is light in weight while still being sufficiently strong to provide the animal with all the support needed.

Still another object is to provide a device of the type above described which is readily attachable and detachable and which can be worn by the animal with relative comfort.

Still another object is to provide a mobile animal support which is capable of comfortably elevating and supporting the injured front or rear end portion of the animal's body so that the legs of the elevated portion are free of the ground or in contact therewith without carrying the full weight of the animal's body while permitting the animal to move about under his own power by the use of his unelevated legs in conjunction with the mobile support.

These and other objects and advantages of this invention will more fully appear from the following description made in connection with the accompanying drawings wherein like reference characters refer to the same or similar parts throughout the several views and in which:

FIG. 1 is a side elevational view of a device constituting one preferred embodiment of this invention as it appears when in use;

FIG. 2 is a back elevational view of the device of FIG. 1;

FIG. 3 is a partial top view of the device partly in plan and partly in section as viewed along the line 3—3 of FIG. 2; and FIG. 4 is a sectional view on an enlarged scale taken along the line 4—4 of FIG. 3.

Reference is now made to the accompanying drawings for a more detailed description of one preferred embodiment of this invention illustrated therein. The embodiment illustrated comprises a pair of substantially identically constructed opposed supporting units A and B which are adjustably interconnected to provide the desired support for the animal. Each of these supporting units includes a vertical strut member 10, the lower end portion of which is provided with a vertically arranged series of apertures 11. A wheel 12 is mounted on each of the struts by means of an axle bolt 13 which rotatably supports the wheel and extends through one of the apertures 11 and is removably fastened thereto by any suitable fastening means such as the nut 14. The height of the device can be vertically adjusted as desired by selective insertion of the axle bolts in one of the apertures 11. An elongate substantially horizontal sling supporting member 15 is rigidly secured to the upper end of each of the struts 10 by any suitable means such as by welding and extends forwardly therefrom, the forward ends of the sling supports 15 being provided with a longitudinal series of apertures 15a for adjustably securing a harness 16 thereto.

A U-shaped bracket 17 is rigidly secured to and extends inwardly from each of the struts 10. Each unit is provided with an elongate rigid longitudinally downwardly concavely curved body supporting strap or member 18, the upper end of which is rigidly connected to the upper end of its respective strut 10 and the lower end of which is attached to the top inner end portion of its respective U-bracket 17 and supported thereby, said straps 18 being longitudinally aligned with each other. The upper face of each of these straps 18 is provided with a resilient spongy cushion or pad 19 for comfortably engaging and supporting the body of the animal.

The two units A and B are adjustably interconnected by means of an elongate connecting plate 20 which extend between the two U-brackets 17 and is removably and adjustably fastened thereto by means of suitable fastening means such as the illustrated bolts 21 and their respective wing nuts 21a. The connecting plate 20 is channel shaped in cross-section, with the open side thereof facing upwardly and is adapted to telescopically receive the brackets 17 as shown, with the web 20a thereof underlying and connected to the lower legs 17a of the U-brackets 17. The plate 20 is longitudinally slidable relative to the lower legs 17a to permit lateral adjustment between the units A and B so as to provide the proper spacing between said units and to adjust the width of the device to the particular animal on which it is to be mounted. Each of the lower bracket legs 17a is provided with a pair of openings 17b, and the plate 20 is provided with a pair of longitudinally extending slots 20a, which openings and slots receive the bolts 21 and serve as the means for accomplishing the lateral adjustment between the units A and B.

The upstanding sides 20b of the plate 20 are in close fitting relationship with the bracket legs 17a and prevent lateral shifting or swinging movement of the brackets relative to the connecting plate and twisting of the units A and B about a vertical axis during use.

One of the sides 20b of the connecting plate is provided with a pair of inwardly extending locking tabs 20c located at opposite ends of said plate, which tabs closely overlie the bracket legs 17a and prevent relative vertical movement between the brackets and the connecting plate and inward tilting of the units A and B during use. These tabs also serve to hold the brackets and connecting plate in proper position to receive the fastening bolts during the assembly thereof.

The device is so designed that when it is applied to a male animal, the brackets 17 can be interconnected in spaced apart relationship (as illustrated) so as to provide an opening 22 therebetween between the inner ends thereof for the reception of the male organ, it being noted that the inner ends of the straps 18 and brackets 17 of each unit are coextensive so as to provide an unobstructed opening.

An elongate sling 23 formed of any suitable flexible material such as canvas extends between and is detachably supported by the sling support members 15. The sling is preferably detachably mountable on the support members 15 to permit periodic washing or replacement thereof, and also to permit its removal in certain circumstances in which it is desirable to dispense with same and have the entire body support provided by the straps 18. The sling is also preferably longitudinally adjustable so that it can be shortened or lengthened as needed to adjust same to the size of the animal and the degree of support desired. The sling is also preferably adjustable longitudinally of the supporting members 15 so that its position can be varied relative thereto and to the animal's abdomen.

In the illustrated embodiment, the end portions of the sling are folded back upon themselves and provided with a plurality of parallel spaced apart rows of stitching 24, the rows of stitching providing a plurality of contiguous parallel slots or channels 25 in the folded-over portion of the sling, each of which is adapted to slidably receive the sling support members 15 so that the sling can be adjustably mounted thereon. Thus, the effective length of the sling can be varied and adjusted by inserting the members 15 in different slots of the sling. The sling is also freely slidable on the members 15 to permit the aforementioned adjustment of the sling relative thereto and to the animal's abdomen.

The harness 16 is detachably secured to the sling support members 15 by suitable fasteners 26 which are inserted in one of the apertures 15a in said members. The illustrated harness includes a body encircling portion or strap 16a which extends across the animal's back and to which the members 15 are fastened so as to be supported thereby and suspended from the animal's back. Said harness also includes a neck encircling portion or strap 16b, which is connected to strap 16a by a lower breast engaging portion or strap 16c and an upper connecting portion or strap 16d. This harnessing arrangement provides proper suspensory support for the members 15 and secures the position of the device on the animal.

In use, the device is assembled as illustrated with the two frame units A and B being interconnected by the connecting plate 20, which plate is adjusted relative to the brackets 17 to properly adjust the width of the device to the particular animal on which it is to be mounted. The width is preferably so adjusted that the curved straps 18 engage the animal's body throughout substantially their entire length so that the animal's body is firmly but comfortably held and supported therebetween and so that there will be no significant lateral shifting movement or swaying of the animal's body relative thereto during use. It will be noted that the curved straps 18 are so designed that they enclose a substantial portion of the side of the animal so that they can firmly clamp the body of the animal therebetween. In short, the straps 18 should be fitted closely but comfortably to the animal so as to positively and securely clamp and support the animal therebetween. This manner of fitting minimizes possible irritation of engageable skin surfaces and more effectively immobilizes the animal's back, which is particularly important where the animal has sustained a back injury.

The wheels are adjusted relative to the struts 10 to locate the curved body supporting members 18 at a height which will elevate and support the injured portion of the animal's body to the degree desired. The degree of elevation will depend on the nature and extent of the injury. In some instances, the legs located at the elevated end of the animal will be maintained completely out of reach and contact with the ground so as to hang freely thereabove. In other instances, said legs will be permitted to contact the ground so as to be able to push lightly thereagainst so that said legs can be exercised without having to support the full weight of the animal's body, the device of this invention in such instances, being adjusted so as to either completely or only partially support the weight of the animal's body.

The assembled device, properly adjusted to height and width thereof as hereinbefore described, is then mounted on the animal. In the illustrated embodiment, the device of this invention is shown mounted on a dog so as to support the rear end portion and hindquarters thereof. The entire frame work is located forwardly of the hindquarters of the animal as illustrated, with the struts 10 and curved straps 18 being disposed immediately in front of and quite close to the animal's hindquarters. The height of the device has prior to mounting, been adjusted by adjustment of the wheels on the struts 10 to enable the curved straps 18 and the pads 19 carried thereon to engage the underside of the animal and provide positive comfortable support therefor. In some instances, some additional adjustment as to width may be necessary after the device has been mounted on the animal, which adjustment can be readily accomplished by loosening the bolts 21 and adjusting the connecting plate 20 relative to the brackets 17 in the manner hereinbefore described.

The sling 23 is positioned lengthwise of its supports 15 to underlie and supportingly engage the abdominal area of the animal. The terms abdomen or abdominal area as used herein, refer to the underside of the body of the animal which is located between the front and rear legs of the animal. The sling relieves the strain on the midportion and back of the animal. The harness 16 is mounted on the animal and the front end portions of these sling support members 15 are attached to the harness. When the device is so mounted, the rear portion of the animal is comfortably and properly elevated and supported by this device to the degree considered desirable.

In some instances, particularly in advance stages of recovery, the sling can be dispensed with altogether with whatever support that is desired being provided entirely by the curved straps 18.

Although the device of this invention has been shown supporting the hind portion of the animal, it will be undestood that it can be mounted and used to elevate the front end and front legs of the animal when desired.

From the foregoing, the advantages attendant upon the use of the device of this invention are readily apparent. This device permits an injured animal to move about under his own power and get the exercise which he needs while supporting the injured portions so that there is little or no pain or discomfort to the animal and no damage to the injured portions. This makes for a happier and more contented animal, hastens the recovery thereof, and permits controlled exercise of the injured portions to strengthen same and return same to normal usage as quickly as possible. The rigid curved straps provide positive support and immobilization of the injured portion of the body, and prevent swaying and shifting thereof during use. The combined use of the rigid and flexible body supporting means permits maximum variation in the type and degree of support which can be provided by the device to meet the particular needs required by the injury. The adjustable features of the device enable it to be fitted to different sized animals as well as enabling the degree and type of support to be varied.

It will, of course, be understood that various changes may be made in the form, details, arrangement and proportions of the various parts without departing from the scope of my invention.

What I claim is:

1. A mobile animal supporting device comprising a wheel supported frame, elongate rigid body supporting means supported by said frame and adapted to transversely underlie and supportingly engage the animals abdomen, said means being longitudinally downwardly curved and adapted to be positioned adjacent to and forwardly of the animals hindquarters, and flexible body supporting sling means supported by said frame and adapted to transversely underlie and supportingly engage the animals abdomen forwardly of said rigid supporting means.

2. A mobile animal supporting device comprising a pair of opposed spaced apart rigidly interconnected wheel supported frame units adapted to receive an animal therebetween, elongate rigid longitudinally and downwardly curved body supporting means disposed between and supported by said frame units and adapted to transversely underlie and supportingly engage the animals abdomen adjacent the hindquarters thereof, flexible sling means extending between and supported by said frame units and adapted to supportingly underlie and engage the animals abdomen forwardly of said rigid supporting means, and harness means connected with said frame units and adapted to extend across the animals back.

3. A mobile animal supporting device comprising a pair of opposed spaced apart rigidly interconnected wheel supported frame units adapted to receive an animal therebetween, elongate longitudinally and downwardly curved rigid body supporting members supported by each of said frame units and extending inwardly therefrom in substantial longitudinal alignment with each other, said members being adapted to supportingly engage the animals abdomen adjacent the hindquarters thereof, the inner ends of said members being disposed in substantially opposed spaced apart relationship and defining a central opening therebetween, and means interconnecting said frame units and adapted to extend across the back of the animal and suspend said frame units therefrom.

4. The device of claim 3, including flexible sling means extending between and supported by said frame units and adapted to supportingly underlie and engage the animals abdomen forwardly of said rigid members.

5. A mobile animal supporting device comprising a pair of opposed spaced apart rigidly interconnected frame units adapted to receive an animal therebetween, said units each including substantially vertical and substantially horizontal members, each of said vertical members having a vertical series of openings therein and being provided with a ground engaging wheel which is attached to the strut by means inserted into one of said openings, elongate rigid longitudinally and downwardly curved body supporting means supported by said units and adapted to transversely supportingly underlie and engage the animals abdomen adjacent the hindquarters thereof, and harness means attachable to said horizontal members forwardly of said body supporting means and adapted to overlie the back of the animal to suspend said horizontal members therefrom.

6. The device of claim 5, including flexible sling means extending between and supported by said horizontal members and adapted to supportingly underlie and engage the animals abdomen forwardly of said body supporting means.

7. The device of claim 5, wherein the means rigidly interconnecting said frame units is adjustable and permits selective variation of the spacing between said units.

8. A mobile animal supporting device comprising a pair of opposed spaced apart frame units adapted to receive an animal therebetween, said units each including a vertical member and a horizontal member extending forwardly from the upper end portion of said vertical member, said vertical members having a vertically arranged series of openings formed in the lower end portions thereof, a ground engaging wheel attached to each of said vertical members by means interchangeably insertable in said openings, elongate longitudinally downwardly curved rigid body supporting members attached to each of said units and extending inwardly therefrom towards each other, the inner ends thereof being disposed in opposed spaced apart relationship and defining a central opening therebetween, bracing structure supported by and extending inwardly from each of said units, said structure underlying said rigid body supporting members and supportingly connected thereto and extending no further inwardly than the inner ends of said rigid members, said structure including elongate horizontal elements vertically spaced from the inner ends of said rigid members, an elongate connecting member extending between and connected to each of said elements and longitudinally adjustable relative thereto, said connecting member maintaining said units in spaced apart relationship, a flexible body supporting sling member extending between and supported by said horizontal members, said flexible and rigid body supporting members being adapted to underlyingly support the animals abdomen, and harness means attachable to said horizontal members and adapted to overlie the back of the animal to suspend said horizontal members therefrom.

9. A mobile animal supporting device comprising a wheel supported frame, said frame including two generally opposed rigid body supporting sections adapted to receive an animal's body therebetween, each of said sections including a portion adapted to transversely underlie and supportingly engage the animal's abdomen, and another portion adapted to engage a side of the animal whereby said sections are capable of combinatively clamping the animal's body therebetween and holding same against lateral shifting movement relative to said frame.

10. The device of claim 9, wherein said sections are movable towards and away from each other so as to selectively vary the spacing therebetween, and means for releasably locking said sections against relative movement therebetween in any selected position.

11. The device of claim 9, including flexible body supporting sling means supported by said frame and adapted to transversely underlie and supportingly engage the animal's abdomen.

12. A mobile animal supporting device comprising a pair of opposed spaced apart wheel supported frame units adapted to receive an animal therebetween, elongate means adapted to extend between and rigidly interconnect said frame units, said means being longitudinally adjustable to selectively vary the distance between said frame units, and body supporting means extending between and supported by said frame units and adapted to supportingly underlie the animal's abdomen, said body supporting means including rigid elongate longitudinally curved means and flexible sling means.

References Cited by the Examiner

UNITED STATES PATENTS

| | | | |
|---|---|---|---|
| 2,546,726 | 3/1951 | Creamer | 280—43 X |
| 2,911,229 | 11/1959 | Strehlow | 280—34 X |
| 2,970,846 | 2/1961 | Boston | 280—40 |

FOREIGN PATENTS 157,374   7/1954   Australia.

ARTHUR L. LA POINT, *Primary Examiner.*